(12) United States Patent
Villaron et al.

(10) Patent No.: US 7,770,180 B2
(45) Date of Patent: Aug. 3, 2010

(54) EXPOSING EMBEDDED DATA IN A COMPUTER-GENERATED DOCUMENT

(75) Inventors: Shawn Villaron, San Jose, CA (US); Brian Jones, Redmond, WA (US); Chad Rothschiller, Edmonds, WA (US); Robert Little, Redmond, WA (US); Sharad Garg, Fremont, CA (US); Su-Piao Bill Wu, Sammamish, WA (US); Josh Pollock, Seattle, WA (US); Andrew Bishop, Redmond, WA (US); Dan Jump, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 913 days.

(21) Appl. No.: 11/431,931

(22) Filed: May 10, 2006

(65) Prior Publication Data

US 2006/0271574 A1 Nov. 30, 2006

Related U.S. Application Data

(63) Continuation-in-part of application No. 11/019,095, filed on Dec. 21, 2004.

(60) Provisional application No. 60/687,461, filed on Jun. 3, 2005.

(51) Int. Cl.
G06F 3/00 (2006.01)
G06F 9/44 (2006.01)
G06F 9/46 (2006.01)
G06F 13/00 (2006.01)

(52) U.S. Cl. ........................... 719/313; 715/209

(58) Field of Classification Search ......... 707/100–102, 707/103 R, 104.1; 719/315, 316, 320, 328, 719/329; 717/108, 116; 715/200, 209, 212–215, 715/234, 239
See application file for complete search history.

(56) References Cited

U.S. PATENT DOCUMENTS 4,410,286 A 10/1983 Ko et al.

(Continued)

FOREIGN PATENT DOCUMENTS

EP 1376387 1/2004

(Continued)

OTHER PUBLICATIONS

Jones, B., "Word XML's Context Free Chunks: Building a Document from Multiple Pieces of Content", http://blogs.msdn.com/brian_jones₁₃ archive/2005/07/20/441167.aspx, Jul. 20, 2005, 4 pages.
Carrano, "Data Abstraction and Problem Solving with C++", copyright 1995, pp. 14-16.
U.S. Official Action mailed Apr. 16, 2009 in U.S. Appl. No. 11/072,188.

(Continued)

*Primary Examiner*—Andy Ho
*Assistant Examiner*—Shih-Wei Kraft
(74) *Attorney, Agent, or Firm*—Merchant & Gould P.C.

(57) ABSTRACT

A mechanism is provided for embedding an object in a receiving or client document such that a client application may operate on the embedded object to include interrogation and modification of data contained in the embedded object. When a given document object is embedded into a receiving document, data representing the embedded object is saved to a data stream storage for the receiving document. When the embedded object in the receiving document is subsequently requested in response to an operation executed on the embedded object, the receiving application obtains the data representation of the embedded object from the data stream storage. Once the receiving application obtains the data representation of the embedded object, the receiving application may perform operations on the embedded object by accessing the embedded object via its data representation.

16 Claims, 5 Drawing Sheets

U.S. PATENT DOCUMENTS

| | | | |
|---|---|---|---|
| 4,594,674 A | 6/1986 | Boulia et al. |
| 4,649,513 A | 3/1987 | Martin et al. |
| 4,870,611 A | 9/1989 | Martin et al. |
| 5,222,205 A | 6/1993 | Larson et al. |
| 5,267,155 A | 11/1993 | Buchanan et al. |
| 5,469,533 A | 11/1995 | Dennis |
| 5,487,138 A | 1/1996 | Rust et al. |
| 5,537,526 A | 7/1996 | Anderson et al. |
| 5,579,466 A | 11/1996 | Habib et al. |
| 5,579,519 A | 11/1996 | Pelletier |
| 5,613,124 A | 3/1997 | Atkinson et al. |
| 5,655,130 A | 8/1997 | Dodge et al. |
| 5,675,788 A | 10/1997 | Husick et al. |
| 5,701,342 A | 12/1997 | Anderson et al. |
| 5,745,910 A | 4/1998 | Piersol et al. |
| 5,752,055 A | 5/1998 | Redpath et al. |
| 5,752,056 A | 5/1998 | Celik |
| 5,819,295 A | 10/1998 | Nakagawa et al. |
| 5,845,058 A | 12/1998 | Shaw et al. |
| 5,893,109 A | 4/1999 | DeRose et al. |
| 5,903,903 A | 5/1999 | Kennedy |
| 5,903,905 A | 5/1999 | Andersen et al. |
| 5,905,504 A | 5/1999 | Barkans et al. |
| 5,911,776 A | 6/1999 | Guck |
| 5,950,215 A | 9/1999 | Tabuchi |
| 5,960,168 A | 9/1999 | Shaw et al. |
| 5,993,088 A | 11/1999 | Nogay et al. |
| 6,023,714 A | 2/2000 | Hill et al. |
| 6,026,416 A | 2/2000 | Kanerva et al. |
| 6,067,531 A | 5/2000 | Hoyt et al. |
| 6,094,665 A | 7/2000 | Lyons et al. |
| 6,134,552 A | 10/2000 | Fritz et al. |
| 6,144,974 A | 11/2000 | Gartland |
| 6,175,845 B1 | 1/2001 | Smith et al. |
| 6,182,080 B1 | 1/2001 | Clements |
| 6,182,096 B1 | 1/2001 | Mastie et al. |
| 6,199,082 B1 | 3/2001 | Ferrel et al. |
| 6,212,530 B1 | 4/2001 | Kadlec |
| 6,247,018 B1 | 6/2001 | Rheaume |
| 6,247,066 B1 | 6/2001 | Tanaka |
| 6,269,403 B1 | 7/2001 | Anders et al. |
| 6,342,904 B1 | 1/2002 | Vasudevan et al. |
| 6,362,870 B2 | 3/2002 | Mui et al. |
| 6,393,441 B1 | 5/2002 | Kanerva et al. |
| 6,407,821 B1 | 6/2002 | Hohensee et al. |
| 6,418,448 B1 | 7/2002 | Sarkar |
| 6,449,653 B2 | 9/2002 | Klemets et al. |
| 6,457,017 B2 | 9/2002 | Watkins et al. |
| 6,480,206 B2 | 11/2002 | Prinzing |
| 6,484,189 B1 | 11/2002 | Gerlach et al. |
| 6,496,206 B1 | 12/2002 | Mernyk et al. |
| 6,507,858 B1 | 1/2003 | Kanerva et al. |
| 6,509,974 B1 | 1/2003 | Hansen |
| 6,538,760 B1 | 3/2003 | deBry et al. |
| 6,549,918 B1 | 4/2003 | Probert, Jr. et al. |
| 6,583,789 B1 | 6/2003 | Carlson et al. |
| 6,591,278 B1 | 7/2003 | Ernst |
| 6,604,144 B1 | 8/2003 | Anders |
| 6,608,693 B1 | 8/2003 | Loyd et al. |
| 6,609,200 B2 | 8/2003 | Anderson et al. |
| 6,654,737 B1 | 11/2003 | Nunez |
| 6,657,647 B1 | 12/2003 | Bright |
| 6,658,477 B1 | 12/2003 | Lisitsa et al. |
| 6,674,540 B1 | 1/2004 | Wiechers et al. |
| 6,675,353 B1 | 1/2004 | Friedman |
| 6,675,356 B1 | 1/2004 | Adler et al. |
| 6,681,223 B1 | 1/2004 | Sundaresan |
| 6,694,485 B1 | 2/2004 | Kelley et al. |
| 6,715,126 B1 | 3/2004 | Chang et al. |
| 6,763,343 B1 | 7/2004 | Brooke et al. |
| 6,771,291 B1 | 8/2004 | DiStefano, III |
| 6,781,609 B1 | 8/2004 | Barker et al. |
| 6,785,673 B1 | 8/2004 | Fernandez |
| 6,789,229 B1 | 9/2004 | Dunietz et al. |
| 6,812,941 B1 | 11/2004 | Brown et al. |
| 6,871,321 B2 | 3/2005 | Wakayama |
| 6,910,843 B2 | 6/2005 | Saw et al. |
| 6,912,555 B2 | 6/2005 | Lemon et al. |
| 6,918,082 B1 | 7/2005 | Gross et al. |
| 6,925,597 B2 | 8/2005 | Anwar |
| 6,925,631 B2 | 8/2005 | Golden |
| 6,931,590 B2 | 8/2005 | Kanie et al. |
| 6,938,203 B1 | 8/2005 | Dimarco et al. |
| 6,941,510 B1 | 9/2005 | Ozzie et al. |
| 6,952,801 B2 | 10/2005 | Warmus et al. |
| 6,961,902 B2 | 11/2005 | Anecki et al. |
| 6,981,207 B1 | 12/2005 | Bakman et al. |
| 6,993,527 B1 | 1/2006 | Raman et al. |
| 7,036,076 B2 | 4/2006 | Anwar |
| 7,051,276 B1 | 5/2006 | Mogilevsky et al. |
| 7,054,841 B1 | 5/2006 | Tenorio |
| 7,080,083 B2 | 7/2006 | Kim et al. |
| 7,134,071 B2 | 11/2006 | Ohwada et al. |
| 7,168,035 B1 | 1/2007 | Bell et al. |
| 7,171,618 B2 | 1/2007 | Harrington et al. |
| 7,290,205 B2 | 10/2007 | Monocsko et al. |
| 7,301,544 B2 | 11/2007 | Yuan |
| 7,412,649 B2 | 8/2008 | Emek et al. |
| 7,418,652 B2 | 8/2008 | Ornstein et al. |
| 7,487,448 B2 | 2/2009 | Emerson et al. |
| 7,512,878 B2 | 3/2009 | Shur et al. |
| 7,549,118 B2 | 6/2009 | Shur et al. |
| 2001/0003828 A1 | 6/2001 | Peterson et al. |
| 2001/0013043 A1 | 8/2001 | Wagner |
| 2001/0016842 A1 | 8/2001 | Umen et al. |
| 2001/0018697 A1 | 8/2001 | Kunitake et al. |
| 2001/0034739 A1 | 10/2001 | Anecki et al. |
| 2001/0039552 A1 | 11/2001 | Killi et al. |
| 2001/0044809 A1 | 11/2001 | Parasnis et al. |
| 2001/0044813 A1 | 11/2001 | Frank |
| 2001/0051962 A1 | 12/2001 | Piotkin |
| 2001/0054042 A1 | 12/2001 | Watkins et al. |
| 2002/0004805 A1 | 1/2002 | Nojima et al. |
| 2002/0016800 A1 | 2/2002 | Spivak et al. |
| 2002/0049790 A1 | 4/2002 | Ricker et al. |
| 2002/0059265 A1 | 5/2002 | Valorose |
| 2002/0059337 A1 | 5/2002 | Takaoka et al. |
| 2002/0065848 A1 | 5/2002 | Walker et al. |
| 2002/0065857 A1 | 5/2002 | Michalewicz |
| 2002/0073236 A1 | 6/2002 | Helgeson et al. |
| 2002/0087602 A1 | 7/2002 | Masuda et al. |
| 2002/0099797 A1 | 7/2002 | Merrell et al. |
| 2002/0103835 A1 | 8/2002 | Kearney |
| 2002/0107886 A1 | 8/2002 | Gentner et al. |
| 2002/0111133 A1 | 8/2002 | Wittkotter |
| 2002/0116416 A1* | 8/2002 | Tesch et al. ............ 707/516 |
| 2002/0116421 A1 | 8/2002 | Fox et al. |
| 2002/0120647 A1 | 8/2002 | Amano |
| 2002/0129058 A1 | 9/2002 | Story et al. |
| 2002/0174145 A1 | 11/2002 | Duga et al. |
| 2002/0184263 A1 | 12/2002 | Perinet et al. |
| 2002/0188638 A1 | 12/2002 | Hamscher |
| 2002/0194220 A1 | 12/2002 | Sluiman |
| 2003/0004957 A1 | 1/2003 | Broman et al. |
| 2003/0023637 A1 | 1/2003 | Halahmi |
| 2003/0028560 A1 | 2/2003 | Kudrolli et al. |
| 2003/0033287 A1 | 2/2003 | Shanahan et al. |
| 2003/0046317 A1* | 3/2003 | Cseri et al. ............ 707/513 |
| 2003/0065946 A1 | 4/2003 | Holliday et al. |
| 2003/0074633 A1 | 4/2003 | Boulmakoul et al. |
| 2003/0079181 A1 | 4/2003 | Schumacher et al. |
| 2003/0093520 A1 | 5/2003 | Beesley |
| 2003/0115547 A1 | 6/2003 | Ohwada et al. |
| 2003/0120671 A1 | 6/2003 | Kim et al. |

| | | |
|---|---|---|
| 2003/0126136 A1 | 7/2003 | Omoigui |
| 2003/0126260 A1 | 7/2003 | Husain et al. |
| 2003/0137539 A1 | 7/2003 | Dees |
| 2003/0137691 A1 | 7/2003 | Tanaka |
| 2003/0142128 A1 | 7/2003 | Reulein et al. |
| 2003/0145134 A1 | 7/2003 | Wehage et al. |
| 2003/0149934 A1 | 8/2003 | Worden .................... 715/513 |
| 2003/0149935 A1 | 8/2003 | Takizawa et al. ............ 715/513 |
| 2003/0158851 A1 | 8/2003 | Britton et al. |
| 2003/0163552 A1 | 8/2003 | Savitzky et al. |
| 2003/0167446 A1 | 9/2003 | Thomas ..................... 715/513 |
| 2003/0172168 A1 | 9/2003 | Mak et al. |
| 2003/0172343 A1 | 9/2003 | Leymaster et al. |
| 2003/0177446 A1 | 9/2003 | Gropper et al. |
| 2003/0177449 A1 | 9/2003 | Rose ......................... 715/530 |
| 2003/0182450 A1 | 9/2003 | Ong et al. |
| 2003/0182656 A1 | 9/2003 | Leathers et al. |
| 2003/0195784 A1 | 10/2003 | Smith |
| 2003/0196176 A1 | 10/2003 | Abu-Ghazalah et al. |
| 2003/0221167 A1 | 11/2003 | Goldstein et al. ........... 715/513 |
| 2003/0222890 A1 | 12/2003 | Salesin et al. |
| 2003/0229845 A1 | 12/2003 | Salesin et al. |
| 2003/0233420 A1 | 12/2003 | Stark et al. |
| 2003/0237048 A1 | 12/2003 | Jones et al. |
| 2003/0237049 A1 | 12/2003 | Sawicki et al. |
| 2004/0003343 A1 | 1/2004 | Liao et al. |
| 2004/0003388 A1 | 1/2004 | Jacquemot et al. |
| 2004/0015782 A1 | 1/2004 | Day et al. |
| 2004/0015890 A1 | 1/2004 | Wong et al. |
| 2004/0015908 A1 | 1/2004 | Giel et al. |
| 2004/0019853 A1 | 1/2004 | Takizawa et al. ............ 715/523 |
| 2004/0030711 A1 | 2/2004 | Roudot |
| 2004/0030987 A1 | 2/2004 | Manelli |
| 2004/0034848 A1 | 2/2004 | Moore et al. |
| 2004/0049737 A1 | 3/2004 | Simon et al. |
| 2004/0054669 A1 | 3/2004 | Seyrat et al. |
| 2004/0054967 A1 | 3/2004 | Brandenberger |
| 2004/0066527 A1 | 4/2004 | Kloosterman et al. |
| 2004/0078755 A1 | 4/2004 | Shinjo et al. |
| 2004/0088332 A1 | 5/2004 | Lee et al. |
| 2004/0103073 A1 | 5/2004 | Blake et al. |
| 2004/0117733 A1 | 6/2004 | Moreau et al. |
| 2004/0128535 A1 | 7/2004 | Cheng |
| 2004/0128623 A1 | 7/2004 | Hudson |
| 2004/0139049 A1 | 7/2004 | Hancock et al. |
| 2004/0148278 A1 | 7/2004 | Milo et al. |
| 2004/0148567 A1 | 7/2004 | Jeon et al. |
| 2004/0153467 A1 | 8/2004 | Conover et al. |
| 2004/0172584 A1 | 9/2004 | Jones et al. |
| 2004/0172592 A1 | 9/2004 | Collie et al. |
| 2004/0181753 A1 | 9/2004 | Michaelides |
| 2004/0183837 A1 | 9/2004 | Watanabe et al. |
| 2004/0194025 A1 | 9/2004 | Hubert et al. |
| 2004/0205533 A1 | 10/2004 | Lopata et al. |
| 2004/0205539 A1 | 10/2004 | Mak et al. |
| 2004/0205580 A1 | 10/2004 | De Angelis et al. |
| 2004/0205623 A1 | 10/2004 | Weil et al. |
| 2004/0205653 A1 | 10/2004 | Hadfield et al. |
| 2004/0205656 A1 | 10/2004 | Reulein et al. |
| 2004/0216048 A1 | 10/2004 | Brown et al. |
| 2004/0221233 A1 | 11/2004 | Thielen |
| 2004/0225957 A1 | 11/2004 | Egilsson |
| 2004/0226012 A1 | 11/2004 | Awada et al. |
| 2004/0230894 A1 | 11/2004 | Elza et al. |
| 2004/0243551 A1 | 12/2004 | Boone et al. |
| 2004/0267553 A1 | 12/2004 | Brunton |
| 2004/0268304 A1 | 12/2004 | Kuo et al. |
| 2005/0005233 A1 | 1/2005 | Kays et al. |
| 2005/0022113 A1 | 1/2005 | Hanlon |
| 2005/0063010 A1 | 3/2005 | Giannetti |
| 2005/0066335 A1 | 3/2005 | Aarts ......................... 719/316 |
| 2005/0071385 A1 | 3/2005 | Rao |
| 2005/0071755 A1 | 3/2005 | Harrington et al. |
| 2005/0091574 A1 | 4/2005 | Maaniitty et al. |
| 2005/0091575 A1 | 4/2005 | Relyea et al. |
| 2005/0099398 A1 | 5/2005 | Garside et al. |
| 2005/0105116 A1 | 5/2005 | Kobashi |
| 2005/0108001 A1 | 5/2005 | Aarskog |
| 2005/0108212 A1 | 5/2005 | Karimisetty et al. ........... 707/3 |
| 2005/0108278 A1 | 5/2005 | Jones et al. |
| 2005/0120061 A1 | 6/2005 | Kraft |
| 2005/0125720 A1 | 6/2005 | Little et al. |
| 2005/0125728 A1 | 6/2005 | Peiro et al. |
| 2005/0132279 A1 | 6/2005 | Relyea et al. |
| 2005/0144556 A1 | 6/2005 | Petersen et al. |
| 2005/0177784 A1 | 8/2005 | Andrews et al. |
| 2005/0192813 A1 | 9/2005 | Richard |
| 2005/0198561 A1 | 9/2005 | McAuley |
| 2005/0204016 A1 | 9/2005 | McAuley |
| 2005/0210026 A1 | 9/2005 | Wood |
| 2005/0223312 A1 | 10/2005 | Erdtmann et al. |
| 2005/0246724 A1 | 11/2005 | Foehr et al. |
| 2005/0248790 A1 | 11/2005 | Ornstein et al. |
| 2005/0249536 A1 | 11/2005 | Sedky et al. |
| 2005/0251735 A1 | 11/2005 | Dunietz et al. |
| 2005/0251739 A1 | 11/2005 | Shur et al. |
| 2005/0251740 A1 | 11/2005 | Shur et al. |
| 2005/0251742 A1 | 11/2005 | Mogilevsky et al. |
| 2005/0268221 A1 | 12/2005 | Shur et al. |
| 2005/0278616 A1 | 12/2005 | Eller |
| 2005/0278626 A1 | 12/2005 | Malik |
| 2006/0010371 A1 | 1/2006 | Shur et al. |
| 2006/0025091 A1 | 2/2006 | Buford |
| 2006/0026585 A1 | 2/2006 | Haselden et al. |
| 2006/0031749 A1 | 2/2006 | Schramm et al. |
| 2006/0031758 A1 | 2/2006 | Shur et al. |
| 2006/0041838 A1 | 2/2006 | Khan |
| 2006/0047743 A1 | 3/2006 | Yuan et al. |
| 2006/0056334 A1 | 3/2006 | Yuan et al. |
| 2006/0080314 A1 | 4/2006 | Hubert et al. |
| 2006/0080316 A1 | 4/2006 | Gilmore et al. |
| 2006/0080603 A1 | 4/2006 | Bailey et al. |
| 2006/0095834 A1 | 5/2006 | Jeon et al. |
| 2006/0117019 A1 | 6/2006 | Sylthe et al. |
| 2006/0136809 A1 | 6/2006 | Fernstrom |
| 2006/0155529 A1 | 7/2006 | Ludviksson et al. |
| 2006/0168562 A1 | 7/2006 | Emek et al. |
| 2006/0206794 A1 | 9/2006 | Ornstein et al. |
| 2006/0227150 A1 | 10/2006 | Yuan |
| 2007/0061384 A1 | 3/2007 | Harrington et al. |
| 2007/0136443 A1 | 6/2007 | Sah et al. |
| 2007/0136662 A1 | 6/2007 | Khaba |

FOREIGN PATENT DOCUMENTS

| | | |
|---|---|---|
| EP | 1 452 966 A2 | 11/2004 |
| EP | 1672543 | 11/2005 |
| EP | 1672528 | 12/2005 |
| JP | 2003288334 | 10/2003 |
| KR | 20030048630 | 6/2003 |
| RU | 2202825 C2 | 4/2003 |
| WO | WO 99/01802 A2 | 1/1999 |
| WO | WO 01/44932 A1 | 6/2001 |
| WO | WO 01/80044 A2 | 10/2001 |
| WO | WO 02/21339 A2 | 3/2002 |
| WO | WO 03/009517 A2 | 1/2003 |
| WO | WO 03/021537 A1 | 3/2003 |
| WO | 2006/133053 | 12/2006 |
| ZA | 2005/09350 | 4/2008 |

OTHER PUBLICATIONS

PCT Search Report dated Jul. 3, 2007 in PCT/US2006/21825.
European Communication dated Mar. 26, 2008 in EP 05112123.4.
Chinese Office Action dated Aug. 1, 2008 in 200510125062.6.
Chinese Second Office Action dated Mar. 6, 2009 in 200510126798.5.

European Search Report dated Mar. 11, 2009 in EP 05111550.9.
European Communication dated Mar. 12, 2009 in EP 05111375.1.
Orchard et al. "[Editorial Draft] Versioning XML Languages W3C Proposed Tag Finding", http://www.w3.org/2001/tag/doc/versioning-20031116, Nov. 16, 2003, pp. 1-23.
Stop Typing the Same Thing, Website Documentation and Screendumps, 4Office Automation Inc., http://web.archive.org/web/20020418015130, http://www.4officeautomation.com/ReplyAssistant, copyright 2002, 4 pages from download software.
U.S. Official Action mailed Jul. 22, 2008 in U.S. Appl. No. 11/072,188.
U.S. Official Action mailed Oct. 30, 2008 in U.S. Appl. No. 11/125,907.
U.S. Official Action mailed Nov. 14, 2008 in U.S. Appl. No. 11/072,659.
U.S. Official Action mailed Dec. 17, 2008 in U.S. Appl. No. 11/019,088.
U.S. Official Action mailed Jan. 23, 2009 in U.S. Appl. No. 11/389,367.
U.S. Official Action mailed Feb. 4, 2007 in U.S. Appl. No. 11/445,903.
European Search Report dated Nov. 30, 2007 in EP 05105111.8.
European Examination Report dated Mar. 14, 2008 in EP 05105111.8.
Chinese Office Action dated Jul. 18, 2008 in 200510126789.6.
Chinese Office Action dated Aug. 22, 2008 in 200510125059.04.
Chinese Office Action dated Oct. 31, 2008 in 200510125058.X.
European Search Report dated Dec. 15, 2008 in EP 05111511.1.
Chinese First Office Action dated Jan. 9, 2009 in 200510127115.8.
Chinese Second Office Action dated Jan. 16, 2009 in 200510125062.6.
Chinese Second Office Action dated Feb. 6, 2009 in 200510126789.6.
Chinese First Office Action dated Feb. 6, 2009 in 200510088462.4.
Adobe Creative Team, "Adobe Acrobat 5.0 Classroom in a Book", published Jun. 26, 2001, Adobe Press, pp. 1-26+cover page. (27 pages).
"@try inCSS3 (was: Useragent Rules in CSS)", http://lists.w3.org/Archives/Public/www-style/2004Mar/0333.html, 2 pages (Mar. 31, 2004).
"Apache Server Frequently Asked Questions", Apache HTTP Server Version 1.3, http://httpd.apache.org/docs/1.3/misc/FAQ.html; 43 pages.
"Controlling the Data Chaos by Adding Intelligence to Media", 4 pages (2004).
"Networked File System", http://www.scit.wlv.ac.uk/~jphb/comms/nfs.htm; 7 pages.
"Open eBook Publication Structure 1.2", http://www.idpf.org/oebps/oebps1.2/download/oeb12-xhtml.htm, 71 pages (Aug. 27, 2002).
Bleuthman et al., "Interleaved Graphics and Text", IBM Technical Disclosure Bulletin, vol. 22, No. 11, pp. 4813-4815 (Apr. 1980).
Chien et al., "Efficient Schemes for Managing Multiversion XML Documents", The VLDB Journal, vol. 11, pp. 332-353 (2002).
Christodoulakis et al., "Multimedia Document Presentation, Information, Extraction, and Document Formation in MINOS: A Model and a System", ACM Transactions on Office Information Systems, vol. 4, No. 4, pp. 345-383 (Oct. 1986).
El-Kwae et al., "Document Image Representation Using XML Technologies", Proceedings of SPIE, vol. 4670, pp. 109-120 (2002).
Ellis, "Postscrip, Bezier Curves and Chinese Characters", ACM, pp. 162-165 (1989).
Girardot et al., "Efficient Representation and Streaming of XML Content Over the Internet Medium", IEEE, pp. 67-70 (2000).
Halvorson et al., "Microsoft Office XP Inside Out, 2001", Microsoft Press, pp. 272, 273 and 289.
Han et al., "WebSplitter: A Unified XML Framework for Multi-Device Collaborative Web Browsing", ACM, pp. 221-230 (2000).
Hardy et al., "Mapping and Displaying Structural Transformations Between XML and PDF", ACM 2002, pp. 95-102 (2002).
Holman, "What is XSL-FO", Google Mar. 20, 2002, http://www.xml.com/pub/a/2002/03/20/xsl-fo.html, 18 pages.
Jacobs et al., "Adaptive Grid-Based Document Layout", ACM Transactions on Graphics, vol. 22, No. 2, pp. 838-847 (Jul. 2003).
Marco et al., "A Framework for Designing and Implementing the Ada Standard Container Library", ACM, pp. 49-61 (2003).
Meyer, O. "aTool-Creating Validated XML Documents on the Fly Using MS Word", pp. 113-121 (Oct. 2002).
Microsoft Word, (hereinafter Word), pp. 1-4 (Copyright 2001).
Miller, "An Introduction to the Resource Description Framework", D-Lib Magazine, ISSN 1082-9873, http://www.dlib.org/dlib/may98/miller/05miller.html, 10 pages (May 1998).
Obasanjo, "Designing Extensible, Versionable XML Formats", Google Jul. 21, 2004, http://www.xml.com/pub/a/2004/07/21/design.html, 17 pages.
Obasanjo, "Designing XML Formats: Versioning vs. Extensibility", Google 2004, blogs.msdn.com/dareobasanjo/archive/2004/04/11/111369.aspx. One additional page is included to show the actual date of the article which is Nov. 17, 2004, 24 pages.
Obasanjo, Designing XML Formats: Versioning vs. Extensibility, Google Apr. 11, 2004, blogs.msdn.com/dareobasanjo/archive/2004/04/11/111369.aspx, 3 pages.
Office Action Correspondence Subsystem, version 1.3 (herein after OACS), copyright Feb. 2003, pp. 1-2 to 1-123, 2-2 to 2-122 and 3-2 to 3-44).
OpenOffice.org, "OpenOffice.org User Guide for Version 1.1.x: Chapter 4: Spreadsheets in Calc", published May 7, 2004, pp. 1, 2, 179-254, http://documentation.openoffice.org/manuals/OO01.x.x/user_guide.pdf.
OpenOffice.org, "OpenOffice.org User Guide for Version 1.1.x: Chapter 5: Creating Presentations With Impress", published May 7, 2004, pp. 1, 2, 255-286, http://documentation.openoffice.org/manuals/OO01.x.x/user_guide.pdf.
Orchard, "Versioning XML Vocabularies", published on XML.com Dec. 3, 2003, http://web.archive.org/web/20031206005000/www.xml.com/pub/a/2003/12/03/versioning.html (This item is from the Internet Archive of xml.com dated Dec. 12, 2003), 12 pages.
Pawson, "Printing from XML: An Introduction to XSL-FO,", Google Oct. 9, 2002, http://www.xml.com/pub/a/2002/10/09/xslfo.html, 6 pages.
Peters et al., "Crystal Web-A Distributed Authoring Environment for the World-Wide Web," Computer Networks and ISDN Systems, vol. 27, No. 6, pp. 861-870 (Apr. 1995).
ReplyAssistant, pp. 1-34 (Copyright 2001).
Sahuguet et al., "Building Intelligent Web Applications Using Lightweight Wrappers", Data and Knowledge Engineering, vol. 36, pp. 283-316 (2001).
StarOffice 7 Office Suite, A Sun ONE Software Offering, Basic Programmer's Guide, pp. 1-10, 47, 91, 104 (Jul. 2003).
Steele, "Easy Microsoft Office Word 2003", published Sep. 19, 2003, Que Corp., pp. 52, 53 and 216 (6 total pp.).
Unknown, ReplyAssistant Version 1.1, downloaded from <http://www.goldmedalsoft.com/shareware/Business_Finance-Miscellaneous-ReplyAssistant-1.1.html>, Copyright 2000-2001, 7 figures, 5 pages ReadMet, 1 page About ReplyAssistant, 15 pages.
van Leeuwen et al., "XML for Flexibility and Extensibility of Design Information Models", Proceedings of CAADRIA, University of Sydney, Australia, pp. 491-502 (2001).
Whitmer, R., "Document Object Model (DOM) Level 3 Xpath Specification", W3C, http://www.w3.org/TR/DOM-Level-3-XPath/, Feb. 26, 2004, Version 1.0, 18 pages.
U.S. Official Action mailed Sep. 20, 2005 in U.S. Appl. No. 10/836,326.
U.S. Official Action mailed May 31, 2006 in U.S. Appl. No. 10/836,326.
U.S. Official Action mailed Oct. 20, 2006 in U.S. Appl. No. 10/836,326.
U.S. Official Action mailed Apr. 9, 2007 in U.S. Appl. No. 10/836,326.
U.S. Official Action mailed Jul. 26, 2007 in U.S. Appl. No. 10/836,326.
U.S. Official Action mailed Feb. 22, 2008 in U.S. Appl. No. 10/836,327.
U.S. Official Action mailed Jun. 28, 2006 in U.S. Appl. No. 10/836,608.
U.S. Official Action mailed Dec. 12, 2006 in U.S. Appl. No. 10/836,608.

U.S. Official Action mailed Mar. 8, 2007 in U.S. Appl. No. 10/836,608.
U.S. Official Action mailed Jul. 27, 2007 in U.S. Appl. No. 10/836,608.
U.S. Official Action mailed Jan. 24, 2005 in U.S. Appl. No. 10/837,040.
U.S. Official Action mailed Jul. 15, 2005 in U.S. Appl. No. 10/837,040.
U.S. Official Action mailed Oct. 18, 2005 in U.S. Appl. No. 10/837,040.
U.S. Official Action mailed Apr. 6, 2006 in U.S. Appl. No. 10/837,040.
U.S. Official Action mailed Sep. 29, 2006 in U.S. Appl. No. 10/837,040.
U.S. Official Action mailed Dec. 19, 2006 in U.S. Appl. No. 10/837,040.
U.S. Official Action mailed May 15, 2007 in U.S. Appl. No. 10/837,040.
U.S. Official Action mailed Jun. 14, 2007 in U.S. Appl. No. 10/955,622.
U.S. Official Action mailed Mar. 17, 2008 in U.S. Appl. No. 10/955,622.
U.S. Official Action mailed Aug. 2, 2007 in U.S. Appl. No. 11/018,405.
U.S. Official Action mailed Feb. 21, 2007 in U.S. Appl. No. 11/018,569.
U.S. Official Action mailed Mar. 18, 2008 in U.S. Appl. No. 11/018,569.
U.S. Official Action mailed Jun. 19, 2007 in U.S. Appl. No. 11/018,718.
U.S. Official Action mailed Mar. 21, 2007 in U.S. Appl. No. 11/018,910.
U.S. Official Action mailed Oct. 3, 2007 in U.S. Appl. No. 11/018,910.
U.S. Official Action mailed Oct. 1, 2007 in U.S. Appl. No. 11/018,912.
U.S. Official Action mailed Mar. 21, 2007 in U.S. Appl. No. 11/019,088.
U.S. Official Action mailed May 8, 2007 in U.S. Appl. No. 11/072,188.
U.S. Official Action mailed Dec. 28, 2007 in U.S. Appl. No. 11/072,188.
U.S. Official Action mailed Sep. 17, 2007 in U.S. Appl. No. 11/072,659.
U.S. Official Action mailed Feb. 4, 2008 in U.S. Appl. No. 11/125,907.
U.S. Official Action mailed Aug. 29, 2006 in U.S. Appl. No. 11/222,344.
U.S. Official Action mailed Feb. 22, 2007 in U.S. Appl. No. 11/222,344.
U.S. Official Action mailed Aug. 1, 2007 in U.S. Appl. No. 11/222,344.
U.S. Official Action mailed Oct. 3, 2006 in U.S. Appl. No. 11/222,442.
U.S. Official Action mailed Feb. 20, 2007 in U.S. Appl. No. 11/222,442.
U.S. Official Action mailed Jul. 10, 2007 in U.S. Appl. No. 11/222,442.
U.S. Official Action mailed Jun. 18, 2007 in U.S. Appl. No. 11/398,339.
U.S. Official Action mailed Mar. 25, 2008 in U.S. Appl. No. 11/398,339.
European Search Report dated Nov. 3, 2006 in EP 05111509.5.
European Search Report dated Dec. 19, 2007 in EP 05111677.0.
European Search Report dated Dec. 19, 2007 in EP 05111375.1.
European Search Report dated Dec. 19, 2007 in EP 05112123.4.
European Examination Report dated Mar. 3, 2008 in EP 05111375.1.
U.S. Appl. No. 11/072,188, filed Mar. 4, 2005 entitled "Method and Apparatus for Utilizing an Object Model to Manage Document Parts for Use in an Electronic Document".
U.S. Appl. No. 11/072,659, filed Mar. 4, 2005 entitled "Method and Apparatus for Utilizing an Extensible Markup Language Schema to Defined Document Parts for Use in an Electronic Document".
U.S. Appl. No. 11/125,907, filed May 10, 2005 entitled "Structuring an Electronic Document for Efficient Identification and Use of Document Parts".
U.S. Appl. No. 11/398,339, filed Apr. 5, 2006 entitled "Structuring Data for Word Processing Documents".
U.S. Appl. No. 11/445,903, filed Jun. 2, 2006 entitled "Structuring Data for Presentation Documents".
U.S. Appl. No. 11/389,367, filed Mar. 24, 2006 entitled "Structuring Data for Spreadsheet Application Documents".
U.S. Appl. No. 10/731,900, filed Dec. 9, 2003 entitled "Context Free Document Portions".
U.S. Appl. No. 10/955,622, filed Sep. 30, 2004 entitled "Method, System, and Computer-Readable Medium for Creating, Inserting and Reusing Document Parts in an Electronic Document".
U.S. Appl. No. 11/019,088, filed Dec. 20, 2004 entitled "Management and Use of Data in a Computer-Generated Document".
U.S. Appl. No. 11/018,718, filed Dec. 20, 2004 entitled "File Formats, Methods, and Computer Program Products for Representing Documents".
U.S. Appl. No. 11/018,569, filed Dec. 20, 2004 entitled "Method and System for Linking Data ranges of a Computer-Generated Document with Associated Extensible Markup Language Elements".
U.S. Appl. No. 11/018,910, filed Dec. 20, 2004 entitled "File Formats, Methods, and Computer Program Products for Representing Presentations".
U.S. Appl. No. 11/018,912, filed Dec. 20, 2004 entitled "File Formats, Methods, and Computer Program Products for Representing Workbooks".
U.S. Appl. No. 11/018,405, filed Dec. 20, 2004 entitled "Context-Free Document Portions with Alternate Formats".
U.S. Official Action mailed May 12, 2006 in U.S. Appl. No. 10/731,900.
Brauer M. et al., "Open Office Specification 1.0," Online Publication, Mar. 22, 2004, XP002404030; Retrieved from the Internet: URL:http://www.oasis-open.org/committees/download.php/6037/office-spec-1.0-cd-l.pdf on Oct. 20, 2006, 607 pp.
Anonymous: "Technical note TN2073: Deconstructing A Keynote 1.x Document: Part One—Slides," Online Publication, May 20, 2003, XP002404031, Retrieved from the Internet: URL:http:///developer.apple.com/technotes/tn2002/pdf/tn2073.pdf on Oct. 20, 2006, 27 pp.
Anonymous: "Technical Note 2067: About the Keynote XML File Format (APXL Schema)," Online Publication, Feb. 12, 2003, XP002404032; Retrieved from the Internet: URL:http://developer.apple.com/technotes/tn2002/pdf/tn2067.pdf on Oct. 20, 2006, 26 pp.
Anonymous: "Mulberry Slideshow XML (v 2.1): A User's Guide," Online Publication, Dec. 7, 2001, XP002404033; Retrieved from the Internet: URL:http://www.mulberrytech.com/slideshow/Mulberry-slideshow.zip on Oct. 20, 2006, 17 pp.
"Introduction to SpreadsheetML", Online Helpfile 'OFFICEXMLSDK.CHM' extracted from 'OFFICE2003XMLSCHEMA.EXE', Dec. 5, 2003 http://www.microsoft.com/downloads/details.aspx?familyid=fe118952-3547-420a-a412-00a2662442d9&displaying=en, retrieved on Apr. 10, 2008, 58 pp.
"Comparative Assessment of Open Documents Formats Market Overview—Valoris", 2003, http://europa.eu/int/idabc/en/document/3439, retrieved on Apr. 10, 2008, 40 pp.
"Microsoft Announces Availability of Open and Royalty-Free License for Office 2003 XML Reference Schemas", Nov. 7, 2003, http://www.microsoft.com/presspass/press/2003/nov3/11-17XMLRefSchemaEMEAPR.mspx, retrieved on Apr. 10, 2008, 2 pp.
U.S. Official Action mailed Feb. 28, 2008 in U.S. Appl. No. 10/731,900 16 pp.
U.S. Official Action mailed Mar. 7, 2007 in U.S. Appl. No. 11/018,912 23 pp.
U.S. Official Action mailed Jul. 26, 2007 in U.S. Appl. No. 11/018,569 11 pp.
U.S. Official Action mailed Aug. 9, 2007 in U.S. Appl. No. 10/731,900 9 pp.
U.S. Official Action mailed May 14, 2008 in U.S. Appl. No. 10/731,900 11 pp.

U.S. Official Action mailed Jun. 26, 2008 in U.S. Appl. No. 11/072,659 12 pp.
U.S. Official Action mailed Jul. 9, 2008 in U.S. Appl. No. 11/019,088 31 pp.
European Examination Report dated Mar. 26, 2008 in EP 05111677.0 19 pp.
European Search Report dated Apr. 22, 2008 in EP 05111549.1 11 pp.
PCT Search Report dated Jun. 25, 2008 in PCT/US2006/21673 10 pp.
European Communication dated Jul. 22, 2008 in EP 05111549.1 9 pp.
Chinese Office Action dated Aug. 1, 2008 in 200510126792.8 20 pp.
Chinese Office Action dated Aug. 1, 2008 in 200510126798.5 26 pp.
Chinese Second Office Action dated Mar. 13, 2009 in 200480001395.1, pp. 1-7.
Chinese Second Office Action dated Mar. 27, 2009 in 20040001339.08, pp. 1-7.
Chinese Decision on Rejection dated Mar. 27, 2009 in 200480001336.4, pp. 1-17.
Chinese Decision on Rejection dated May 8, 2009 in 200510125059.04, pp. 1-14.
Chinese Third Office Action dated Jun. 5, 2009 in 200510126789.6, pp. 1-7.
Russian Official Action dated Jan. 13, 2008 in 2412-139543RU/8132, pp. 1-9.
European Communication dated Jul. 10, 2009, in EP 05111511.1-1527, pp. 1-5.
Fontaine, J., "moodss (Modular Object Oriented Dynamic Spreadsheet)", http://web.archive.org/web/20050311052520l/http://jfontain.free.fr/moodss.htm, published Mar. 11, 2005, 42 pp plus 1 wayback page (total 43 pp).
U.S. Official Action mailed Jul. 30, 2009 in U.S. Appl. No. 11/389,367, pp. 1-42.
U.S. Official Action mailed Aug. 4, 2009 in U.S. Appl. No. 11/072,659, pp. 1-33.
U.S. Official Action mailed Aug. 5, 2009 in U.S. Appl. No. 11/445,903, pp. 1-29.
U.S. Official Action mailed Sep. 16, 2009 in U.S. Appl. No. 11/072,659, pp. 1-17.
Mexican Official Action dated Jun. 9, 2009 in PA/a/2005/012556, pp. 1-3.
Mexican Official Action dated Jun. 9, 2009 in PA/a/2005/012553, pp. 1-6.
U.S. Official Action mailed Oct. 5, 2009 in U.S. Appl. No. 11/072,188, pp. 1-23.
Gudgin, M., "SOAP Version 1.2 Part 1: Messaging Framework", W3C Candidate Recommendation (Dec. 19, 2002), pp. 1-65.
Chinese Second Office Action dated Jun. 5, 2009 in 200480001312.9, pp. 1-9.
Chinese Third Office Action dated Jul. 17, 2009 in 200480001395.01, pp. 1-7.
U.S. Official Action mailed Oct. 23, 2009 in U.S. Appl. No. 10/992,329, pp. 1-12.
Chinese Third Office Action dated Sep. 25, 2009 in 200480001336.4, pp. 1-6.
Chinese Third Office Action dated Oct. 16, 2009 in 200480001312.9, pp. 1-7.
U.S. Official Action mailed Jan. 21, 2010 in U.S. Appl. No. 11/072,659 pp. 1-19.
Russian Official Action dated Nov. 11, 2009 in 2005135951, pp. 1-8.
Russian Official Action dated Dec. 9, 2009 in 2005139787, pp. 1-6.
Mexican Official Action dated Oct. 23, 2009 in PA/a/2005/012553 pp. 1-7.
Russian Official Action dated Dec. 24, 2009 in 2005139793.
Illingwarth V. M. et al.,: "The Explanatory Dictionary in Computing Systems", Moscow: Mashinostroenie, 1990, pp. 1-4.
Russian State Standard 7.83-2001, pp. 1-3.
Big Soviet Encyclopedia, Rubrikon, 1978, pp. 1-4.

* cited by examiner

EXPOSING EMBEDDED DATA IN A COMPUTER-GENERATED DOCUMENT

CROSS-REFERENCE TO RELATED APPLICATIONS

This patent application claims priority to U.S. Patent Application Ser. No. 60/687,461 filed Jun. 3, 2005, entitled "Embedded Document Modeling," and this patent application is a continuation-in-part of U.S. patent application Ser. No. 11/019,095 filed Dec. 21, 2004, entitled "Method and System for Exposing Nested Data in a Computer-Generated Document in a Transparent Manner," the disclosures of which are expressly incorporated herein by reference.

BACKGROUND

With the advent of the computer age, computer and software users have grown accustomed to user-friendly software applications that help then write, calculate, organize, prepare presentations, send and receive electronic mail, make music, and the like. For example, modern electronic word processing applications allow users to prepare a variety of useful documents. Modern spreadsheet applications allow users to enter, manipulate, and organize data. Modern electronic slide presentation applications allow users to create a variety of slide presentations containing text, pictures, data or other useful objects.

Often documents, spreadsheets, presentations, and the like, generated by such applications are embedded with document objects from other documents generated by other applications. For example, a user may desire to embed a chart object from a spreadsheet application document into a memorandum document generated by a word processing application. Or, a user may desire to embed a word processing document object into a slide presentation document. While such embedded objects may be displayed in the receiving document, operating on embedded objects via the receiving document application is very limited. For example, a user may be able to move an embedded object in the receiving document using the functionality of the receiving document application, but the user may not interrogate or modify the data contained in the embedded object. For example, if a user desires to modify data contained in a chart object that has been embedded in a word processing document, the user may be required to go back to the providing application document (e.g., spreadsheet application document) to make modifications to the data contained in the embedded chart object, followed by a replacement or update of the embedded chart object in the receiving document.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the invention solve the above and other problems by providing a mechanism for embedding an object from a providing or server document into a receiving or client document such that a client application with which the receiving document is provided may operate on the embedded object to include interrogation and modification of data contained in the embedded object. According to embodiments, when a given document object is embedded into a receiving document, data representing the embedded object, for example, an Extensible Markup Language (XML) representation of the embedded object, is saved to a data stream storage for the receiving document. A schema associated with the data representation may also be saved to the data stream storage. When the data representation of the embedded object is saved, a program identification (progID) and class identification (classID) for the providing application and for the embedded object are maintained in the registry of the operating system that enables operation of the receiving application.

When the embedded object in the receiving document is subsequently requested in response to an operation executed on the embedded object (for example, an attempted modification of data in the embedded object), the receiving application obtains the data representation of the embedded object from the data stream storage based on the progID and classID for the embedded object. Once the receiving application obtains the data representation of the embedded object along with any associated schema, the receiving application may perform operations on the embedded object by accessing the embedded object via the data representation of the embedded object.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to exposing data representing an embedded document object to allow a receiving or client application to operate on the embedded object. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
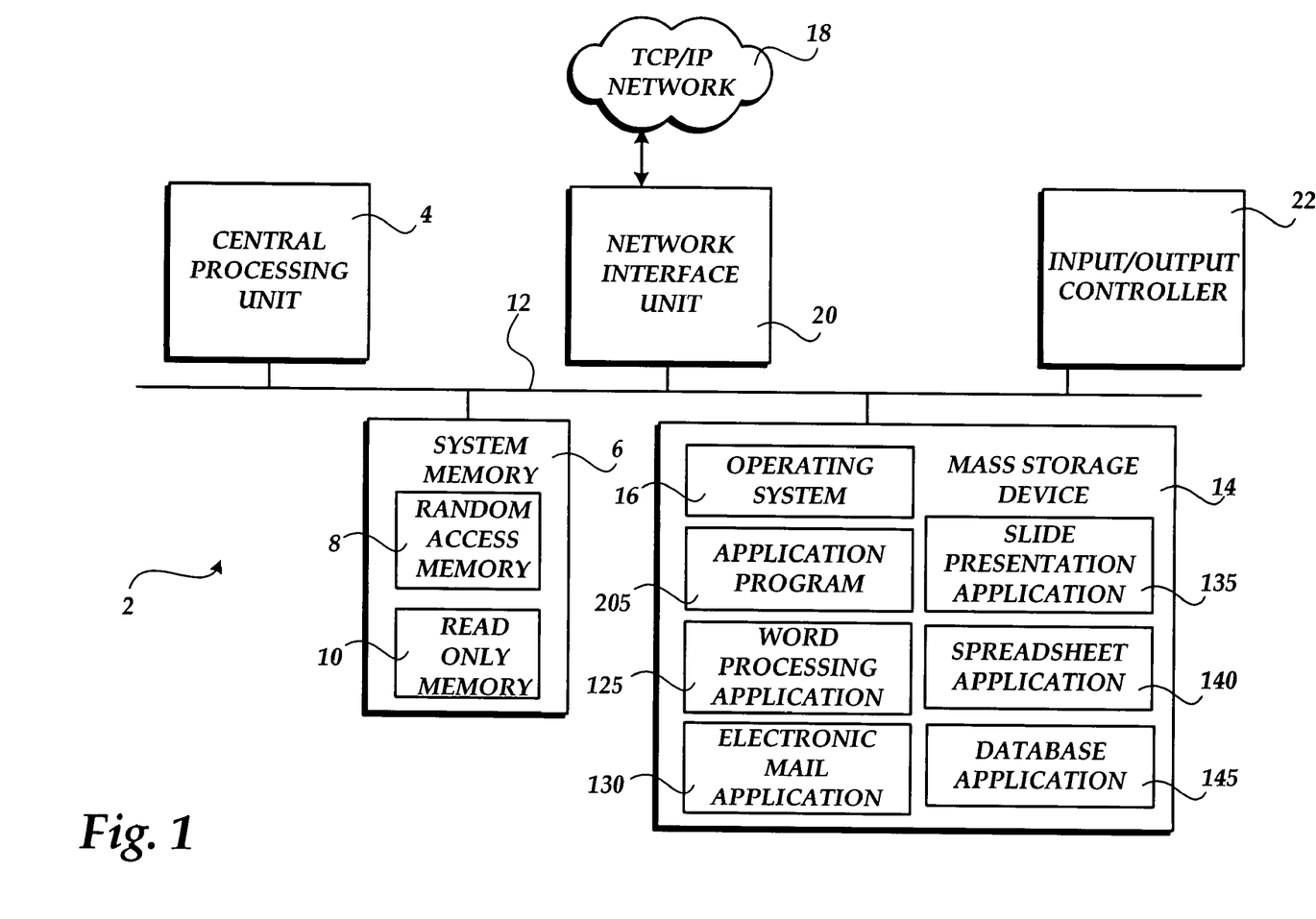
FIG. 1 is a block diagram showing the architecture of a personal computer that provides an illustrative operating environment for embodiments of the present invention.

Referring now to the drawings, in which like numerals refer to like elements through the several figures, aspects of the present invention and an exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS % operating systems from Microsoft Corporation of Redmond, Wash. The mass storage device 14 and RAM 8 may also store one or more application programs. In particular, the mass storage device 14 and RAM 8 may store an application program 205 for providing a variety of functionalities to a user. For instance, the application program 205 may comprise many types of programs such as a word processing application, a spreadsheet application, a desktop publishing application, and the like. According to an embodiment of the present invention, the application program 205 comprises a multiple functionality software application suite for providing functionality from a number of different software applications. Some of the individual program modules that may comprise the multiple functionality application suite 205 include a word processing application 125, a slide presentation application 135, a spreadsheet application 140 and a database application 145. An example of such a multiple functionality application suite 205 is OFFICE™ manufactured by Microsoft Corporation. Other software applications illustrated in FIG. 1 include an electronic mail application 130.

Figure 2:
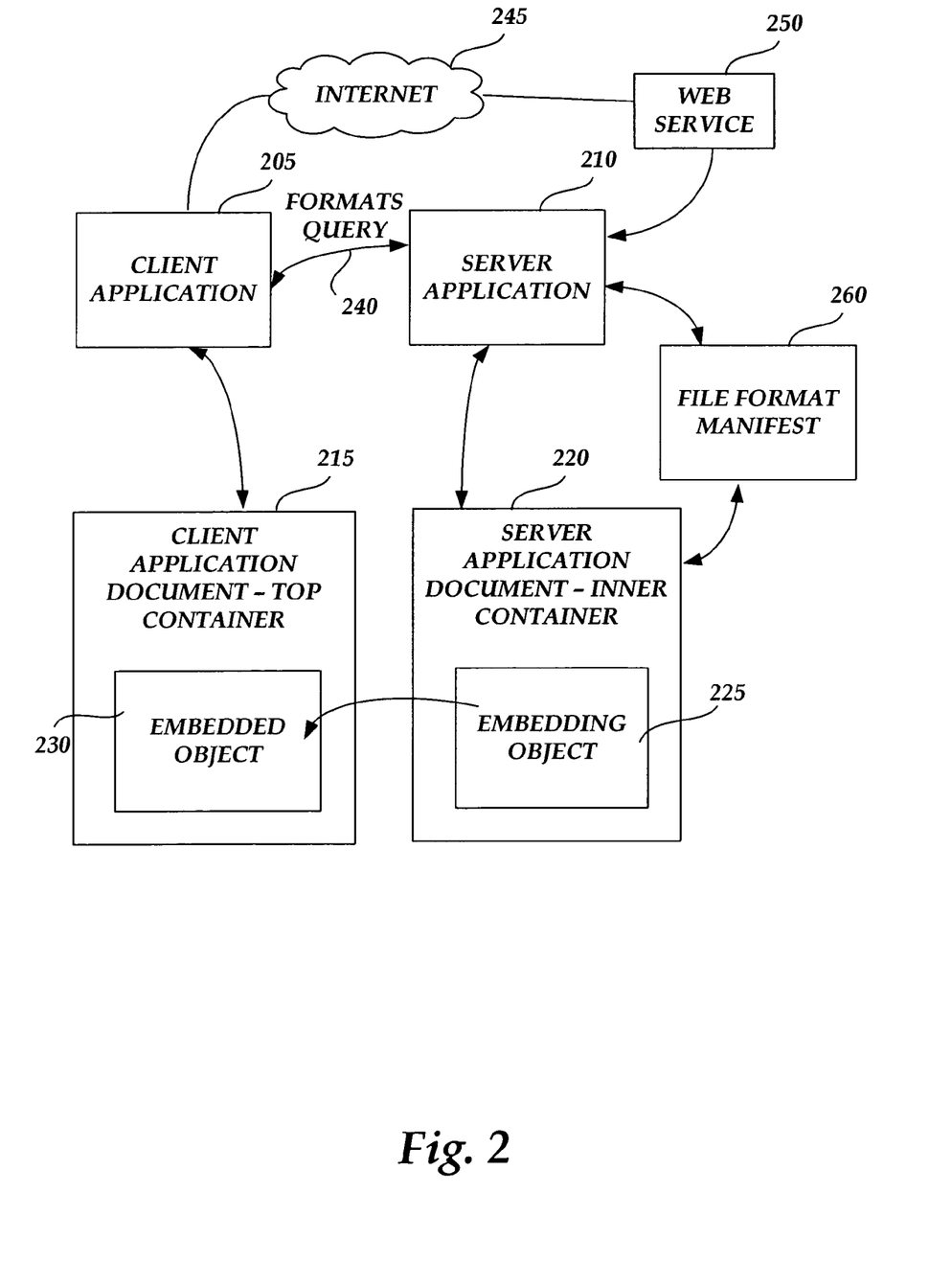
FIG. 2 is a simplified block diagram illustrating interaction between a client application and a server application for obtaining formatting and other information about an embedded object embedded into a client application document from a server application document.

FIG. 2 is a simplified block diagram illustrating interaction between a client application (client) and a server application (server) for obtaining formatting and other information about an object embedded into a client application document from a server application document. Referring to FIG. 2, a client application document 215 representing a top-level container receives an embedded object 230 from a server application document representing an inner container. The embedding object 225 represents text, data, pictures, images, charts, and the like that is copied to or moved to the client application document 215, or that is pointed to by the client application document 215.

The client application 205 is representative of a software application being utilized for generating or editing the client application document. The server application 210 is representative of a software application being used for generating or editing the server application document. The client application 205 and the server application 210 may represent multi-application suites containing multiple software applications, for example, word processing applications, spreadsheet applications, slide presentation applications, database applications, and the like. In addition, as should be understood, the client application 205 and the server application 210 may be two of such multiple applications belonging to a single application suite. On the other hand, the client application 205 and the server application 210 may be separate applications operated by different users or entities in a distributed computing network where the client application 205 is enabled to communicate with the server application as described herein.

As illustrated in FIG. 2, an embedding object 225 is embedded into a client application document 215 in order to insert the data, coding or other information associated with the embedding object 225 into the client application document 215 as an embedded object 230. For example, the client application 205 may be a word processing application with which a client application document 215, for example, a memorandum, is being generated or edited. In order to provide a chart of data, for example, salary information for all sales employees of a given organization, the author/editor of the client application document 215 may desire to embed a chart object 225 from a server application document 220, for example, a spreadsheet document, generated or edited by a server application 210, for example, a spreadsheet application. As briefly described above, a problem with prior methods and systems for embedding objects into a client application document results from an inability of the client application 205 responsible for generating and/or editing the client application document 215 to understand or read formatting information, properties, methods, mechanisms, and the like associated with the embedded object imparted to the embedded object by the server application 210 responsible for generating and/or editing the embedded object.

For example, the following is a simplified Extensible Markup Language (XML) representation of a sample word processing document having an embedded slide presentation application object in the sample word processing document. As should be understood by those skilled in the art, the example XML representations illustrated and described below are simplified, are for purposes of example only, and are not limiting in any way of the application or operation of embodiments of the present invention described herein. Referring to the example XML representation below, the information contained in the following representation after the XML markup "<w:binData w:name="oledata.mso"> and before the XML markup </w:binData> is representative of the slide presentation object embedded into the sample word processing document. As can be seen, the information associated with the embedded object may be very difficult to understand, if at all, by the client application generating or editing the associated client application document, for example, the word processing document.

```
<?xml version="1.0" encoding="UTF-8" standalone="yes"?>
<?mso-application progid="Word.Document"?>
<w:wordDocument
xmlns:w=http://schemas.microsoft.com/office/word/2003/wordml>
<w:docOleData>
   <w:binData w:name="oledata.mso">
    0M8R4KGxGuEAAAAAAAAAAAAAAAAAAAAPgADAP7/C
QAGAAAAAAAAAAAAAAABAAAAAQAAAAAAAAAAEAAAAgA
AAAEAAAD+////AAAAAAAAAAD//////////////////////////////////
///////////////////////////////////////////////////////////
///////////////////////////////////////////////////////////
/////////////////
/DEANQAzADEANAAxADUAOQA0AAAAAAAAAAAAAAAAAA
AAAAAAAAAAAAAAAAAAAAAAAAAAAAAAAAAAAAABgAAg
H/////////////8AAAAAAAAAAAAAAAAAAAAAAAAAAAAAAA
AAAAAAAAAAAAAAAAAAAAWgoAAAAAAAAAAAAAAAA
AAAAAAAAAAAAAAAAAAAAAAAAAAAAAAAAAAAAAAAAA
AAAAAAAAAAAAAAAAAAAAAAAAAAAAAAAAAAAAAAAAP
/////////////wAAAAAAAAAAAAAAAAAAAAAAAAAAAAAA
AAAAAAAAAAAAAAAAAAAAAAAAAAAAAAAAAAAAAAAAA
AAAAAAAAAAAAAAAAAAAAAAAAAAAAAAAAAAAAAAAAA
AAAAAAAAAAAAAAAAAAAAAAAAAAAAAAAAAAAAAAAAA/
////////////AAAAAAAAAAAAAAAAAAAAAA
```

```
o9RcjOS6a7TCVdc9sz2e+UeMivhf3rqQ16rKUv5C1/GrIg50C2abL
ymb5dtQ0193p4PwRNzkJ+3vazrk5e5zmsU24+e1V75Pznd8785xzBOQ
BLAJUIHYhKSfq0nDgmiGYAM4ELgVnARcDFwHuACmA2YAFzg
LnAe4F5wPuAS4BLgfnAZcD7gQXAQmARsBi4HKgErgA+AF
QBHwQ+BFwJfBhYAlwFXA1cA3wE+Cjx2kZ0LVADLAU+
BtQCdcB1wDLg48By4Hpl+w2obwRWAJ8E6oEg8CnVf64WxKLu
HxEf6U1zzhxEqmiw3pgqY3/k3OcxXxFujscSsVDSCsY67HgwFo4
mrYZIuMUWIbSiIRi3E3Y02ZQMx6IiinJ0iwXd4iV0/Koff3FcDQ
wRk2dfTpgcbxy7a/rvPbbB5Pg+bhj018qG1qaOqHVzOBJ
pisei7KUGaqUm6sBctehmCiNzRfAcx7yNnqX005ixXk0f9Z5zx
NBXd73+Vn1r4Pv3+mnBpQ8/w/H+b5LzkftvIbkHawQ
497aRnLObSM7b3STn5g/UN4Mk1/AjJOcxJ+
   </w:binData>
</w:docOleData>
<w:p>
   <w:r>
    <w:t>
    This is some text
    </w:t>
   </w:r>
</w:p>
```

According to embodiments of the present invention, when an embedded object is requested by a client application document 215 for embedding in the client application document as an embedded object 230, the client application 205 queries the server application 210 responsible for generating and/or editing a server application document from which the embedded object 230 is being requested for formatting information, properties, methods, mechanisms, and/or the like associated with the requested object. The client application 205 requests from the server application 210 information about the requested object to allow the client application 205 to understand the formatting, coding and other properties associated with the requested object and to enable the client application 205 to operate on the requested object according to the properties imparted to the embedded object by the server application so that the embedded object coding, formatting and properties become transparent and available to the client application.

As described above, the client application requests information about the requested object to enable the client application to better utilize the requested object. According to prior and well-known OLE object embedding principles, an embedded object may include various information that may be available to the client application 205. For example, metafile information may be passed to the client application that is an image that the server application returns from the serving application. But, because the client application does not understand the embedded object's file format, according to prior methods, it is up to the server application to give the client application an image to use to display the object. For instance, if a spreadsheet object is embedded in a word processing document, the view that is displayed of that spreadsheet object in the word processing document is an image of the spreadsheet object. The image is updated whenever the embedded object is activated, and usually this happens when a user double clicks on the embedded object. Other information may include a classID that identifies the server application that should be called to render the embedded object. That is, the classID maps to the server application. Additional information may include information regarding actual persistence of the file. According to one embodiment this information is in the form of an IStorage format. For example, a spreadsheet object within a word processing document is stored similarly as it is stored when it is saved by the spreadsheet application (server).

The metafile information is stored as a separate image that any client application can access as needed. For example, when the image is saved, rather than write the information out as a simple binary data file, the registry is surveyed to determine if the application that matches the classID for the requested object has indicated a content type for the object. According to embodiments, the content type identifies the object. For example, for an image object of a server document, the content type associated with the object may be "JPEG" or "GIF." If the server application has identified a content type for the object, then a determination is made as to what file extension is associated with the identified content type. If a content type and a file extension are determined, then the client application may call out the content type and apply the correct extension to the file (object). The client application may then take the requested object from the server application document and treat the requested object as a native object of the client application because the client application understands the content type and file extension. In addition, the registry may be surveyed to determine if the persistence format for the file (requested object) is an IStorage format. Some file formats like the well-known ".doc" format are in IStorage format. According to embodiments of the present invention, the object data stream may be "wrapped" in an IStorage format so that it can also be acted on by the client application as described herein.

According to an embodiment, objects may be embedded in embedded objects. For example, a chart object embedded into a word processing document may, in turn, include a slide presentation object from a slide presentation application embedded into the chart object. Accordingly, the slide presentation object would be embedded in the chart object, which may then be embedded in the client application document 215 as the embedded object 230. According to embodiments of the present invention, the server application 210 would request and receive formatting information, properties, methods and mechanisms associated with the slide presentation object embedded into the chart object, and ultimately, the client application 205, for example, a word processing application, would receive formatting information, properties, methods and mechanisms associated with the embedded object from both the example spreadsheet application and the example slide presentation application associated with the slide presentation application object embedded into the chart object.

The following is a simplified XML representation illustrating the nesting of one container (document or object) into another container (document or object). For the following example, consider a first object includes a parts list and consider that an embedded object includes parts identification information.

```
<container>
  <partslist>
    <part id="1"/>
    <container>
      <partslist>
        <part id=1'"/>
        <part id="2"/>
      </partslist>
    </container>
    <part id="n"/>
  </partslist>
</container>
```

According to a particular example implementation types could be assigned to "parts" and the <part id="#"/> syntax could be replaced with <part id="#" type="item"/> and the nested <container> could be replaced with <part id="#" type="container"/>. In addition, an inheritance model with the nested containers may be created. For example, metadata may be associated with a container (document or object) that describes whether or not code might be found within the embedded document's or object's parts. As shown below, this metadata association may be made by using an attribute on the <container> element.

```
<container containscode="false">
  <partslist>
    <part id="1"/>
    ...
    <part id="n"/>
  </partslist>
</container>
```

By creating a hierarchy between nested objects, many problems associated with nested objects described above may be addressed. For example, given the example above, if an embedding is added to the container that contains code (e.g., potential virus), without a hierarchical relationship between the embedded object and the receiving document or object a representation like the following representation may result.

```
<container containscode="false">
  <partslist>
    <part id="1"/>
    <container containscode="true">
      <partslist>
        <part id=1'"/>
        <part id="2"/>
      </partslist>
    </container>
    <part id="n"/>
  </partslist>
</container>
```

On the other hand, with a relationship between the embedded object and the containing document or object (container), an improved representation such as the following may be generated.

```
<container containscode="true">
  <partslist>
    <part id="1"/>
    <container containscode="true">
      <partslist>
        <part id=1'"/>
        <part id="2"/>
      </partslist>
    </container>
    <part id="n"/>
  </partslist>
</container>
```

As described herein, when an embedding object 225 is requested from a server application document 220 for embedding in a client application document 215 as an embedded object 230, a formats query 240 is passed from the client application 205 to the server application 210 for information about file formats associated with the requested object. As described herein, the term "file formats" is meant to include format types, for example, Hypertext Markup Language (HTML), rich text formatting (RTF), XML, and the like, formatting properties, and methods and/or mechanisms (coding) utilized by the server application for generating or editing the requested object.

According to one embodiment of the present invention, the client application 205 passes an application program interface (API) call to the server application 210 for the requested information. According to this embodiment, the client application 205 may pass a first API call for obtaining all file formats available from the server application that may have been used by the server application on or in association with the requested object. The first API call may be in the form of "EnumerateFileFormats( )" for obtaining a listing of all file formats available from the server application 210 that may be utilized by the server application for formatting or applying properties to the requested object. If the server application is of a different type as the client application (e.g., spreadsheet application versus word processing application), the client application may need a list of all available file formats for operating the embedded object according to the file formats native to the object as received from the server application document.

Alternatively, a second API call may be passed to the server application to obtain only the file format information associated with the requested object. For example the second API call may be in the form of "GetFileData(fileformat)" and may be passed from the client application 205 to the server application 210 for obtaining particular format information applied to the particular requested object. Once the client application 205 obtains a listing of available file formats and/or particular file formats applied to the requested object, the client application 205 may utilize the requested object in the client application document 215 in a transparent manner as the client application 205 would utilize or operate on other data or information contained in the client application document 215.

According to alternative embodiments, the formats query 240 between the client application 205 and the server application 210 may take the form of a web service 250, illustrated in FIG. 2, for obtaining file format information from the server application 210. As should be understood, the server application 210 may be located separately from the client application 205 over a distributed computing network such as the Internet 245. According to this embodiment of the present invention, a web service 250 may be utilized for receiving queries from client applications 205 and for obtaining requested file format information from server applications 210. According to a web service application 250, the client application 205 does not have to generate API calls or other requests according to the known language or protocols of the server applications 210. That is, the web service 250 may operate as an interface or layer between the requesting client application 205 for receiving requested information from server applications associated with requested server application documents and requested embedding objects 225.

According to another embodiment, a file format manifest may be generated by the server application 210 for enumerating file formats available from the server application or that are associated with particular objects from server application documents. According to this embodiment, when an embedding object 225 is requested from a server application document 220 for embedding into a client application document 215, the formats query 240 from the client application 205 to the server application 210 requests the file format manifest 260 from the server application 210 associated with the server application document and the embedding object 225. Once the client application 205 receives the file format manifest 260, the client application 205 may parse the file format manifest 260 to obtain file format information associated with the server application 210 or to obtain particular file format information associated with the requested embedding object 225.

Figure 3:
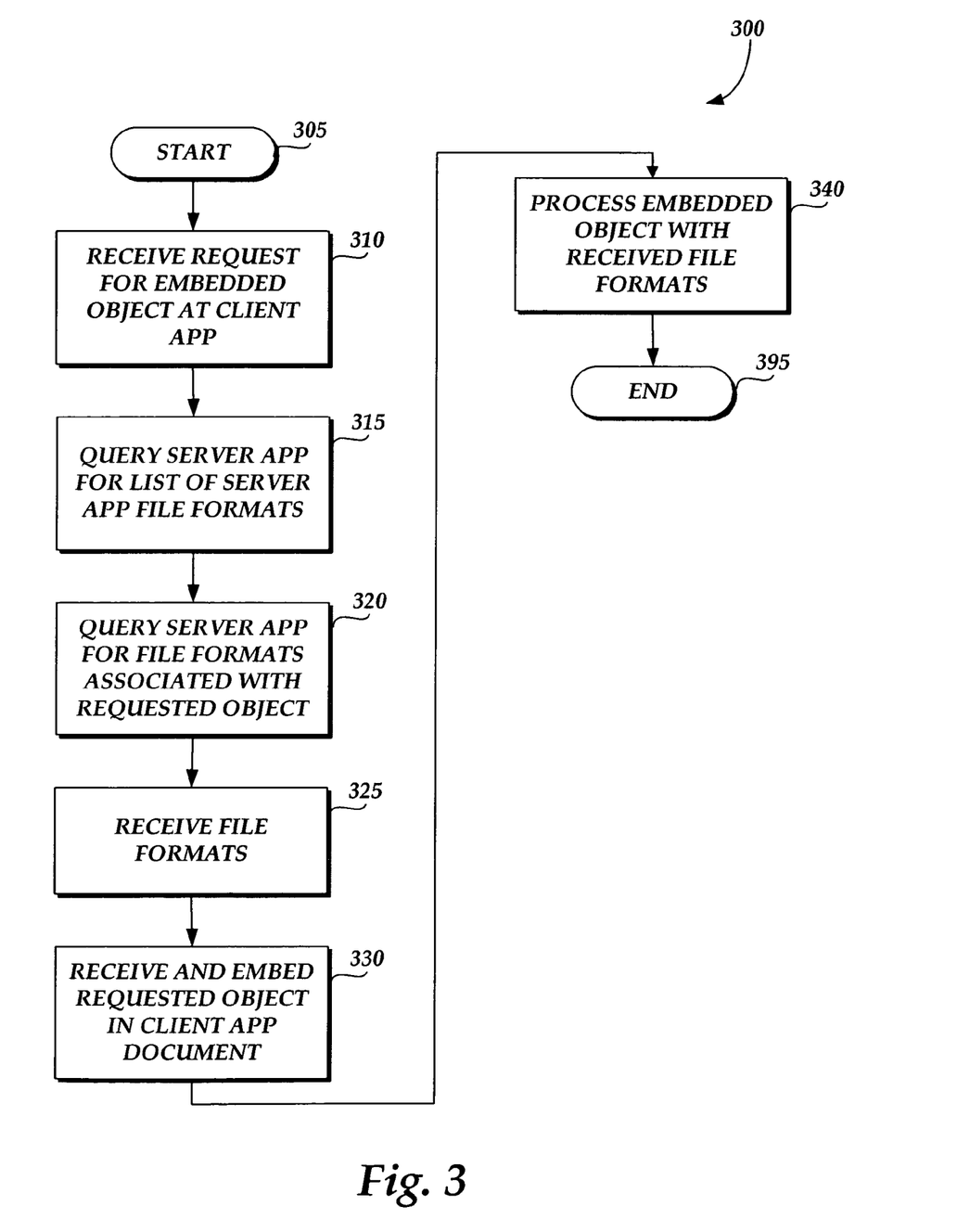
FIG. 3 is a flow diagram of an exposing of nested data associated with an embedded object embedded into a client application document from a server application document according to embodiments of the present invention.

Having described embodiments of the present invention with respect to FIGS. 1 and 2 above, FIG. 3 is a flow diagram illustrating steps performed by a method and system of the present invention for exposing nested data associated with an embedded object embedded into a client application document from a server application document. The routine 300 begins at start block 305 and proceeds to block 310 where a request is received at the client application 205 for an embedded object in the client application document 215. For example, the request may be in the form of a copying of a chart object from a spreadsheet document 220 containing employee salary information into a memorandum document 215 being generated with a word processing client application 205.

At operation 315, in response to the request for the embedded object 230 into the client application document 215, the client application 205 sends a formats query 240 to the server application 210 for a listing of application file formats available from the server application 210, for example, a spreadsheet application. As described above, the formats query 240 may be in the form of an API call to the server application 210, or the formats query 240 may be a call to a web service 250, or the formats query 240 may be a request for a file format manifest 260 for review by the client application 205. At operation 320, the client application 205 queries the server application 210 for particular file formats information associated with the requested object 225. As should be understood, the query from the client application to the server application for both a listing of available file formats and for particular file formats associated with the requested object may be in the form of a single formats query 240.

At operation 325, the requested file formats information is received by the client application 205, and at operation 330, the client application 205 receives and embeds the requested object 225 into the client application document 215 as the embedded object 230. At operation 345, the client application 205 utilizes the received file format information for processing and for rendering transparent the embedded object 230. For example, if the embedded object 230 is a chart object from a spreadsheet application document containing a summary of employee salary information, because the client application 205 has access to file format information associated with the embedded object, all other information associated with the embedded object becomes transparent to the client application 205. For example, if the embedded object also includes detailed employee information associated with the summary salary information, the client application 205 may access the detailed employee information and may process or otherwise operate on the detailed information associated with the embedded object because the client application 205 has access to file formats, methods, mechanisms or other properties applied to or associated with all data contained or associated with the embedded object as received from the server application document 220 and as imparted to the embedded object by the server application 210. The method ends at operation 395.

As described above with reference to FIGS. 1-3, a mechanism is provided for exposing formatting data for an embedded object to allow a receiving or client application to display an embedded object so that the embedded object does not become an opaque region in the client application document outside the functional reach or understanding of the client application. According to additional embodiments of the invention, a mechanism is provided for exposing data representing an embedded object to a receiving or client application to allow the receiving or client application to operate on the embedded object to allow for interrogation and modification of data contained in the embedded object by the receiving or client application.

Figure 4:
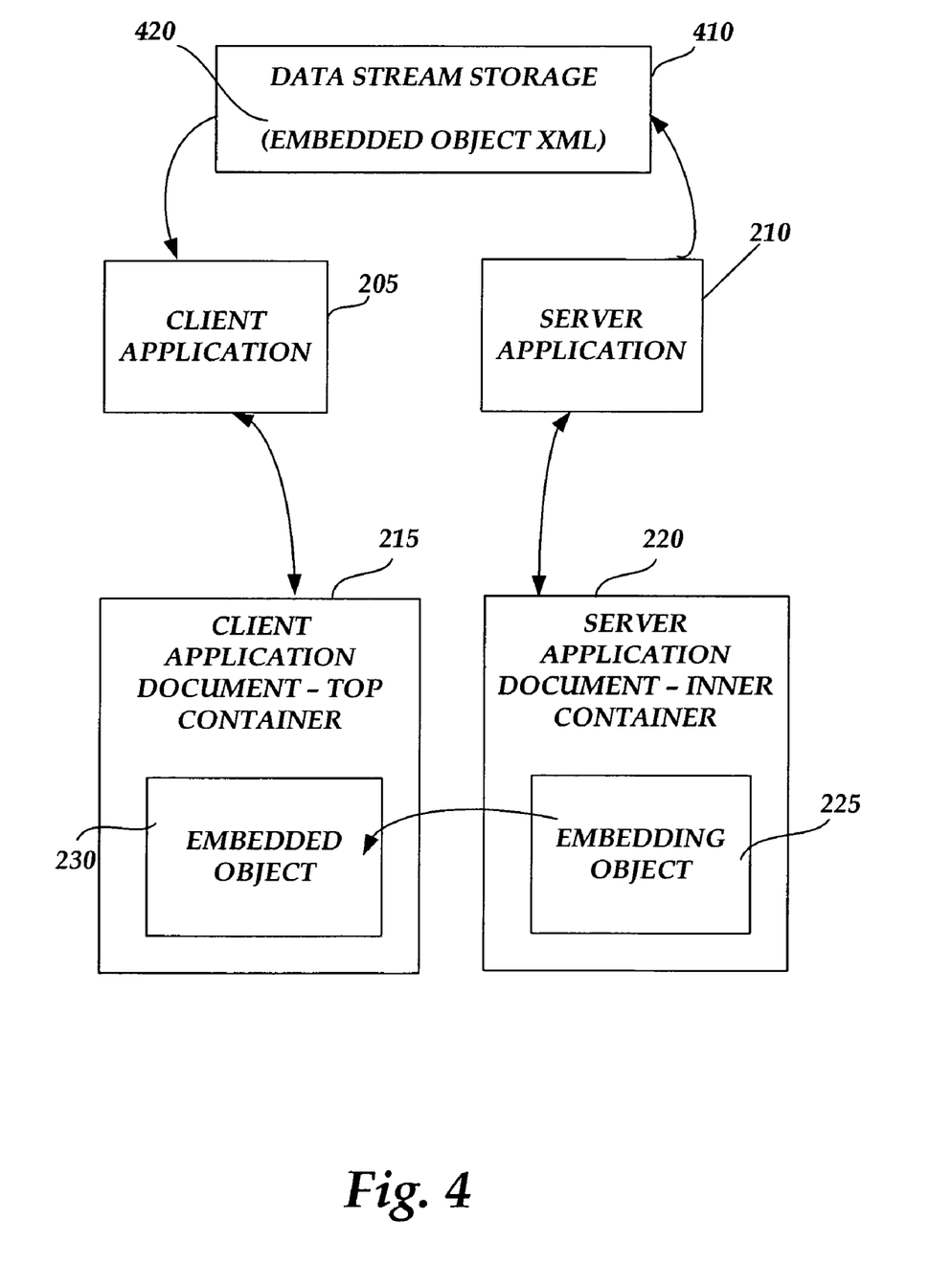
FIG. 4 is a simplified block diagram illustrating interaction between a client application and a server application for obtaining data representing an embedded object to allow operation on the embedded object by the client application.

As illustrated in FIG. 4, according to embodiments, when an embedding object 225 is embedded from a providing or server application document 220 into a receiving or client application document 215 as an embedded object 230, data representing the embedded object 230 is stored to a data stream storage 410 for the client application document. According to an embodiment, the data stream storage 410 for the client application document is in the format of an IStorage stream for the receiving document. For example, if the receiving or client application document is a word processing document, a data stream containing all data for the receiving document including user data, formatting data, file format data, or any other data required for representation of the receiving document and required by the client application 205 for operating the receiving document are stored to the data stream storage 410. When an object is embedded from a server or providing document, for example, a spreadsheet document, data representing the embedded object is inserted into the data stream for the receiving or client document 215. When data representing the embedded object is stored to the data stream for the client document, an identification of data representing the embedded object is also stored. According to an embodiment, a program identification (progID) and a class identification (classID) for the embedded object and for the providing or server application 210 associated with the embedded object are maintained in the registry of the operating system 16 that enables operation of the client application 205.

According to embodiments, data representing the embedded object may be stored to the data stream 410 according to different formats. For example, a first data representation of the embedded object may be stored to the data stream according to an Extensible Markup Language (XML) format, described below, and a first program ID and a first class ID may be stored to the registry for the XML format. Other data representations for the embedded object may be stored to the data stream 410 according to alternate formats, for example, binary format, and the alternate formats may be registered with the operating system registry according to alternate program IDs and class IDs. Thus, a requesting client application may request data representing the embedded object from the data stream 410 according to a desired data format (e.g., XML, binary, other).

As described above, according to one embodiment, data representing the embedded object is stored to the data stream 410 as an Extensible Markup Language (XML) data representation. In addition, an XML schema associated with the XML data representation of the embedded object may be stored with the XML representation. As should be appreciated by those skilled in the art, the XML schema associated with the XML representation of the embedded object may provide grammatical and syntax rules associated with the XML markup utilized for representing the embedded object. Thus, a receiving or client application 205 may utilize the XML representation of the embedded object in accordance with the associated XML schema file or data. That is, according to embodiments, as long as the receiving or client application 205 may consume the XML representation of the embedded object according to the associated XML schema, the client application 205 may utilize the embedded object via the native functionality of the client application 205 to include interrogation (search and find) and modification of data contained in the embedded object.

For example, if a given embedded object includes a chart object containing data from a spreadsheet document that has been embedded in a word processing document, then a receiving word processing application may utilize data contained in the embedded chart object based on the XML representation of the data contained in the chart object. For example, if a particular cell of data contained in the chart object has been marked up with XML data that has been defined by an associated XML schema, then the receiving or client application 205 may search, find, and modify the data contained in the example cell in the spreadsheet chart using the native functionality of the client word processing application because the word processing application may locate and operate on the data based on its location and definition in the embedded object according to the XML representation of the data.

Figure 5:
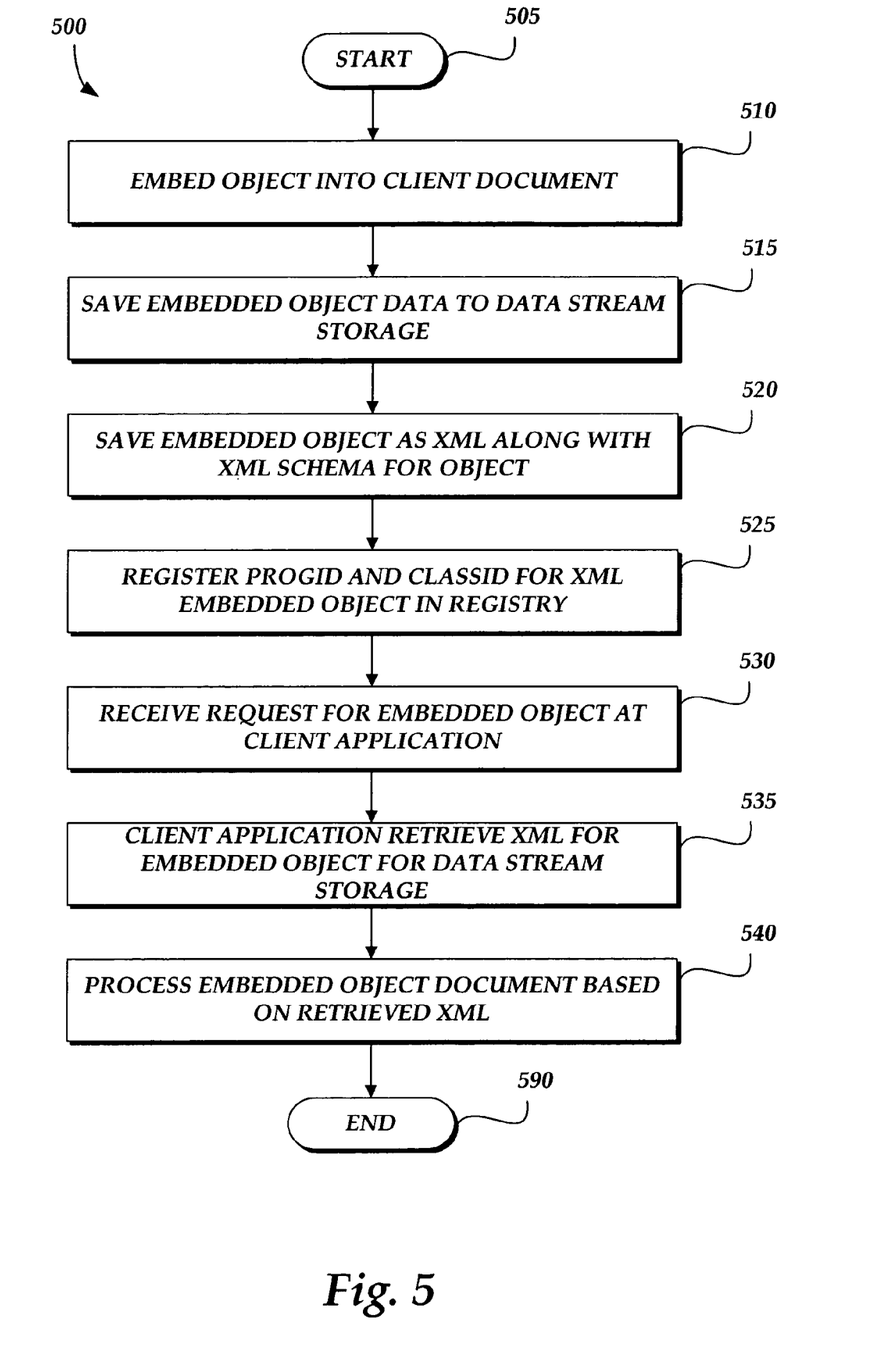
FIG. 5 is a flow diagram illustrating an exposing of data representing an embedded object to a client application for allowing the client application to operate on the embedded object.

Having described embodiments of the present invention with respect to FIG. 4 above, FIG. 5 is a flow diagram illustrating an exposing of data representing an embedded object to a client application for allowing the client application to operate on the embedded object. The method 500 begins at start operation 505 and proceeds to operation 510 where an object is embedded into a client document. For purposes of example, consider that a chart containing one or more rows and columns of data is embedded from a spreadsheet document 220 into a word processing document 215.

At operation 515, data contained in the embedded object is saved to the data stream storage 410 for the receiving client document 215. At operation 520, the embedded object is saved as an XML representation, along with any associated or required XML schema for the XML representation of the embedded object. At operation 525, a program ID and a class ID for the XML representation of the embedded object are stored in the registry of the operating system 16 that enables operation of the receiving client application 205. As described above, data representing the embedded object may be stored to the data stream storage 410 for the client document 215 according to other formats, for example, a binary format. If multiple formats of the embedded object data are stored to the data stream storage 410, then unique program IDs and class IDs for the different formats are registered with the operating system registry.

At operation 530, a request is received at the client application 205 for the embedded object. As should be understood, a request received for the embedded object may be in the form of any attempted operation on the embedded object (including operation on data contained in the embedded object). For example, a request for the embedded object may be in the form of a search for particular data contained in the embedded object. For another example, a request for the embedded object may be in the form of an attempt to move the embedded object in the client document 215. For another example, a request for the embedded object may be in the form of an attempt to modify (insert, delete, copy, move, paste, and the like) data contained in the embedded object.

At operation 535, in response to the request for the embedded object, the client application 205 parses the data stream storage 410 for the data representation of the embedded object based on the program ID and class ID registered in the operating system registry for the XML representation of the requested embedded object. As should be appreciated if the client document 215 is in XML format, then the program ID and class ID used to locate the data representation will be the IDs associated with the XML formatted data representation. If the client document 215 is formatted according to another format, for example, binary format, then an alternate format data representation of the embedded object may be requested. Next, the client application 215 retrieves the XML representation of the embedded object along with any associated XML schema from the data stream storage for the client document 215. According to embodiments, the XML based representation of the embedded object is retrieved by the client application.

At operation 540, the client application 205 processes the request for the embedded object in the client document 215 based on the retrieved XML representation of the embedded object. For example, if the requested operation includes searching and finding a particular data item in the embedded object, then the client application 205 will utilize its native search and find functionality to find the desired data in the embedded object based on the XML markup applied to the desired data in accordance with any XML schema associated with the embedded object. For example, if the desired data is represented by an XML markup tag <datacell2>, then the client application 205 may parse the XML representation of the embedded object to locate the data represented by this particular markup in order to process the requested search and find operation. The routine ends at end operation 590.

As described herein, exposing data representing an embedded document object is provided to allow a receiving or client application to operate on the embedded object. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A computer readable storage medium containing computer executable instructions which when executed by a computer perform a method for exposing data of an embedded object to a receiving software application, comprising:

sending, from the receiving software application, a formats query for a file format manifest comprising information about file formats associated with a requested embedded object, the file formats comprising at least one of formatting properties, methods, and coding utilized by a providing software application for editing the requested embedded object;

parsing the file format manifest to obtain the information about the file formats;

storing a data representation of the embedded object, wherein the object is embedded in a receiving document in a data stream representing the receiving document according to a data format, wherein the object is embedded in the receiving document from a providing document, wherein when the object is embedded from the providing document, the data representation of the object is inserted into the data stream by the providing software application associated with the embedded object for receipt by the receiving software application, wherein the data stream comprises user data, formatting data, file format data, and other data for representing the receiving document and for operating the receiving document containing the embedded object, by the receiving software application, wherein storing the data representation of the object includes storing a markup language representation of the object in the data stream representing the receiving document;

receiving a program ID and a class ID, associated with the data format, to identify the data representation of the embedded object, wherein the program ID and the class ID are associated with the providing software application;

receiving a request for an operation on the object at the receiving software application;

in response to receiving the request for an operation on the object at the receiving software application, parsing the data stream for the data representation of the object; and at the receiving software application, utilizing the data representation of the object for processing the operation on the object via a native functionality of the receiving software application, wherein the object comprises a file format utilized by the providing software application for generating a first document type which is different than a file format utilized by the receiving software application for generating a second document type.

2. The computer readable storage medium of claim 1, prior to storing the data representation of the object in the data stream representing the receiving document, receiving a request for embedding the object from a providing document into the receiving document.

3. The computer readable storage medium of claim 1, further comprising storing a markup language schema associated with the markup language representation of the object in the data stream representing the receiving document.

4. The computer readable storage medium of claim 3, wherein utilizing the data representing the object for processing the operation on the embedded object includes parsing the markup language representation of the object for exposing the object to one or more functionalities of the receiving software application.

5. The computer readable storage medium of claim 1, further comprising storing the program ID and the class ID for the data representation in the data stream representing the receiving document.

6. The computer readable storage medium of claim 5, further comprising maintaining the program ID and the class ID in an operating system registry.

7. The computer readable storage medium of claim 5, wherein parsing the data stream for the data representation of the object includes locating the data representation of the object based on the program ID and the class ID.

8. A computer readable storage medium containing computer executable instructions which when executed by a computer perform a method for exposing data of an embedded object to a receiving software application, comprising:

sending, from the receiving software application, a formats query for a file format manifest comprising information about file formats associated with a requested embedded object, the file formats comprising at least one of formatting properties, methods, and coding utilized by a providing software application for editing the requested embedded object;

parsing the file format manifest to obtain the information about the file formats;

storing an Extensible Markup Language (XML) representation of the object in a data stream representing the receiving document, wherein the object is embedded in the receiving document from the providing document, wherein when the object is embedded from the providing document, the XML representation of the object is inserted into the data stream by a providing software application associated with the embedded object for receipt by the receiving software application, wherein the data stream comprises user data, formatting data, file format data, and other data for representing the receiving document and for operating the receiving document containing the embedded object, by the elk & receiving software application;

receiving a program ID and a class ID to identify the XML representation of the embedded object, wherein the program ID and the class ID are associated with the providing software application;

receiving a request for an operation on the object at the receiving software application;

in response to receiving the request for an operation on the object at the receiving software application, parsing the data stream for the Extensible Markup Language (XML) representation of the object in the data stream representing the receiving document; and at the receiving software application, utilizing the Extensible Markup Language (XML) representation of the object for processing the operation on the object via a native functionality of the receiving software application, wherein the object comprises a file format utilized by the providing software application for generating a first document type which is different than a file format utilized by the receiving software application for generating a second document type.

9. The computer readable storage medium of claim 8, further comprising storing an XML schema associated with the XML representation of the object in the data stream representing the receiving document.

10. The computer readable storage medium of claim 8, wherein utilizing the Extensible Markup Language (XML) representation of the object for processing the operation on the object includes parsing the XML representation of the object for exposing the object to one or more functionalities of the receiving software application.

11. The computer readable storage medium of claim 8, further comprising storing the program ID and the class ID for the XML representation in the data stream representing the receiving document.

12. The computer readable storage medium of claim 11, further comprising maintaining the program ID and the class ID in an operating system registry.

13. The computer readable storage medium of claim 11, wherein parsing the data stream for the XML representation of the object includes locating the XML representation of the object based on the program ID and the class ID.

14. A method for exposing an embedded object to a receiving software application, comprising:

sending, from the receiving software application, a formats query for a file format manifest comprising information about file formats associated with a requested embedded object, the file formats comprising at least one of formatting properties, methods, and coding utilized by a providing software application for editing the requested embedded object;

parsing the file format manifest to obtain the information about the file formats;

storing, by a client computer, an Extensible Markup Language (XML) representation of an object embedded in a receiving document in a data stream representing the receiving document, wherein the object is embedded in the receiving document from a providing document, wherein when the object is embedded from the providing document, the XML representation of the object is inserted into the data stream by a providing software application associated with the embedded object for receipt by the receiving software application, wherein the data stream comprises user data, formatting data, file format data, and other data for representing the receiving document and for operating the receiving document containing the embedded object, by the receiving software application;

receiving a program ID and a class ID to identify the XML representation of the embedded object, wherein the program ID and the class ID are associated with the providing software application;

receiving, by the client computer, a request for application of a functionality of the receiving software application on the object;

in response to receiving the request for application or a functionality of the receiving software application on the object, retrieving, by the client computer, the Extensible Markup Language (XML) representation of the object;

at the receiving software application, parsing the XML representation of the object for exposing the object to the functionality of the receiving software application; and utilizing the XML representation of the object for applying the functionality to the object via a native functionality of the receiving software application, wherein the object comprises a file format utilized by the providing software application for generating a first document type which is different than a file format utilized by the receiving software application for generating a second document type.

15. The method of claim 14, further comprising storing the program ID and the class ID the XML representation in the data stream representing the receiving document.

16. The method of claim 15, wherein parsing the XML representation of the object for exposing the object to the functionality of the receiving software application includes locating the XML representation of the object based on the program ID and the class ID.

* * * * *